May 24, 1966  G. R. ANGUS ETAL  3,252,744
DYNAMOELECTRIC MACHINE

Filed Dec. 27, 1961  3 Sheets-Sheet 1

INVENTORS
GEORGE R. ANGUS
RAYMOND M. DUNAISKI
HOWARD D. SNIVELY

BY James R Campbell

ATTORNEY

INVENTORS
GEORGE R. ANGUS
RAYMOND M. DUNAISKI
HOWARD D. SNIVELY
BY James R Campbell
ATTORNEY INVENTORS
GEORGE R. ANGUS
RAYMOND M. DUNAISKI
HOWARD D. SNIVELY
BY
*James R Campbell*
ATTORNEY

United States Patent Office 3,252,744
Patented May 24, 1966

3,252,744
DYNAMOELECTRIC MACHINE
George R. Angus, Schenectady, Raymond M. Dunaiski, Scotia, and Howard D. Snively, Schenectady, N.Y., assignors to General Electric Company, a corporation of New York
Filed Dec. 27, 1961, Ser. No. 162,395
1 Claim. (Cl. 308—160)

The invention described herein relates to a motor having contra-rotating armatures arranged for electrodynamic cooperation with a stationary field structure mounted in the frame of the motor.

The concept of utilizing contra-rotating elements in a single motor housing for driving coaxially arranged rotatable output shafts is well known. In its usual form, the motor includes a rotatable armature connected to drive one of the coaxial shafts in one direction while a rotatable field structure or stator drives the other shaft in the opposite direction. This kind of construction offers many important benefits since both rotatable elements can be concentrated in a relatively small motor frame and they serve substantially the same function of satisfying the demands of a connected load as two separate motors, each of about half the size as the contra-rotating type. Also, savings in both labor and material costs results in an economical construction.

However, there are major disadvantages inherent in presently known contra-rotating machines of the above type. Usually, field excitation power is supplied to the field pole windings through brushes mounted on a non-rotating part of the structure and which engage a slip ring assembly which rotates with the field. Similarly the armature power is supplied to the machine by means of stationary brushes engaging collector rings rotating with the field structure. The path within the machine between the collector rings is as follows: through commutating and cooperating field windings to a brush rigging of one polarity engaging a commutator and then through the armature winding and back to a brush rigging of opposite polarity and finally the collector ring. Since both the field structure and armature rotate, no stationary structure is available for supporting the commutator brush holders for at least one of these elements and it therefore is necessary to mount them on the other rotating member. It will be evident that as the elements rotate in opposite directions, the relative speed between them will be double that of a conventional motor thus subjecting the brushes to a rubbing velocity twice that encountered in a machine having a fixed or stationary field structure. It is generally recognized that in order to obtain acceptable commutation, the upper limit of rubbing speed between the commutator and brushes is in the neighborhood of 6000–8000 feet per minute. Velocities greater than this adversely affect the current collecting ability which results in poor commutation with correspondingly poor operation of the motor. Since the rubbing velocity of brushes in a contra-rotating stator and rotor rapidly reach these maximum values, it is apparent that severe limitations are placed on the operating speed of the motor.

Another disadvantage associated with the contra-rotating rotor and stator type of motor lies in the necessity for maintaining pressure between the current collecting surface and the brushes as constant as possible during the life of the brushes. The brushes customarily are mounted on one of the rotating elements and therefore are subjected to centrifugal forces of rotation which are in opposition to the brush spring tension and accordingly varies the pressure which normally should be applied with constant force to the brush. If compensation for this action is incorporated in the brush spring to furnish average brush pressures during operation, the tension is either too great or too small when the machine is rotated at any speed other than that for which the brush pressure is set. Moreover, uneven brush wear which may result, causes an imbalance in the rotating element which is especially noticeable and undesirable at high speeds. This imbalance further contributes to the sound noise level of the motor during operation.

It has been observed that a slip ring assembly must be used with known contra-rotating rotor and stator designs to furnish the necessary power to the motor windings. Although this may not constitute a drawback in small machines, it presents problems of current collection between the ring and the brush in large machines because the maximum magnitudes of current which can be transferred is in the neighborhood of 100 amperes per brush.

It therefore is evident that the need exists for a contra-rotating motor capable of eliminating the deficiencies now present in known designs of machines of this type.

The primary object of our invention therefore is to provide a contra-rotating motor having a fixed stationary field structure and armatures or rotors rotatable in opposite directions for driving coaxially arranged output shafts.

Another object of our invention is to provide an improved brush rigging in a contra-rotating motor for obtaining improved efficiency in transferring power to the motor windings.

Another object of our invention is to provide a design capable of permitting independent adjustment in the transmittal torque and speeds of the two rotating shafts; and Still another object is to provide a contra-rotating motor which will provide a maximum rating per inch of motor diameter.

In carrying out our invention we provide a motor having a frame enclosing a first armature or rotor equipped with windings and a commutator in a manner well known in the art. A stationary field structure consisting generally of a plurality of circumferentially disposed field poles is positioned around the armature and is designed for electro-dynamic cooperation therewith. A second armature or rotor of substantially the same electrical design as the first armature is mounted for rotation around the field structure and in a direction opposite to that of the first rotor. In order to provide electric power to the windings of both armatures, a stationary brush rigging is disposed within the motor frame and is equipped with brushes adapted for contact with the commutators respectively disposed on the armature shafts. Electric power is supplied to the field windings through the stationary elements supporting the field structure. Each of the rotatable elements then are mounted in bearings disposed on opposite sides of the motor for driving coaxially arranged shafts which serve to supply mechanical power to a connected load.

While the specification concludes with claim particularly pointing out and distinctly claiming the subject matter which we regard as our invention, it is believed the invention will be better understood from the following description taken in connection with the accompanying drawings in which:

Figure 1:
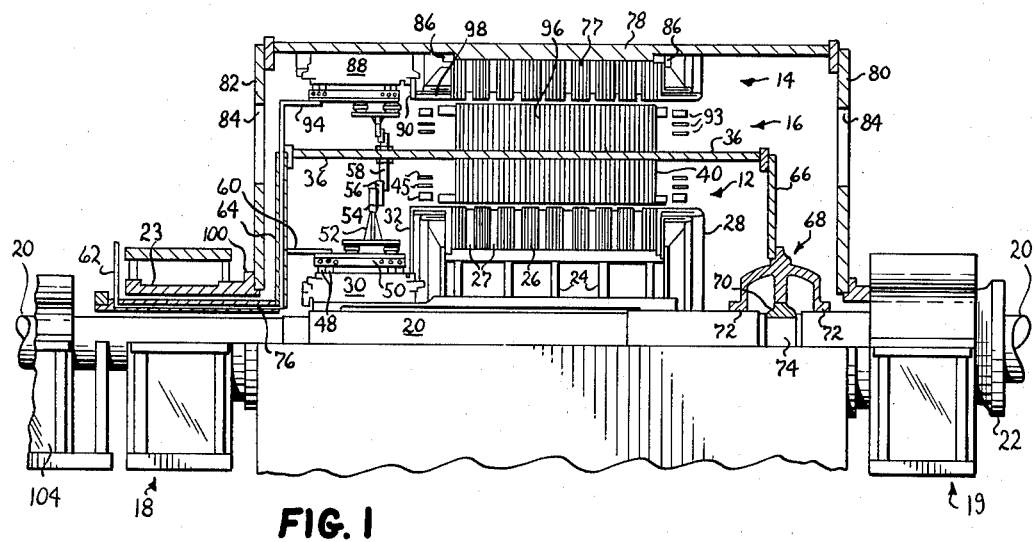
FIGURE 1 is a view in elevation, partly in section, of a contra-rotating motor having rotors designed for simultaneous operation in opposite directions.
Figure 2:
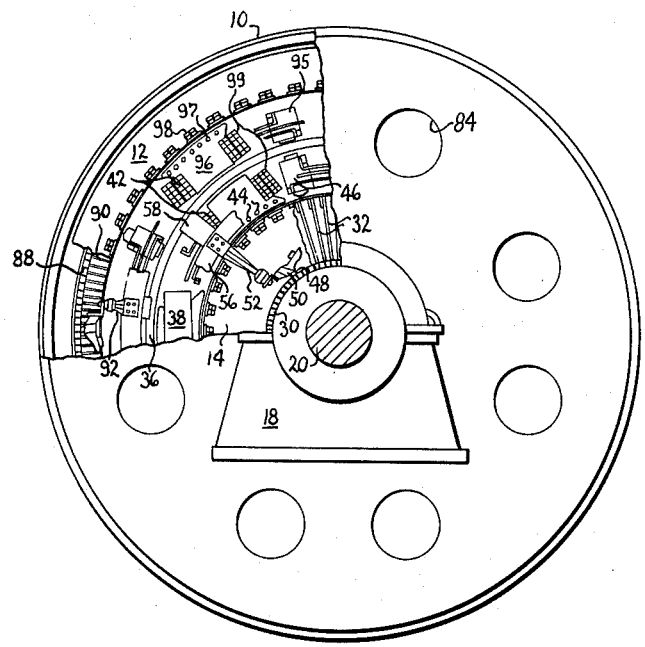
FIGURE 2 is an end view of the motor shown in FIGURE 1 with parts broken away illustrating the disposition of the various elements comprising the motor.

Referring now to the drawings wherein like reference characters designate like or corresponding parts throughout the several views, there is shown in FIGURES 1 and 2, a motor frame 10 enclosing a pair of contra-rotating armatures or rotors 12 and 14 designed for electrodynamic reaction with a stationary field structure 16. The armatures 12 and 14, which rotate in opposite directions, are supported in bearings 18 and 19 and are connected with coaxially arranged rotatable output shafts 20 and 22 adapted for supplying mechanical power to an external load.

The bearing designs disclosed herein are of sufficient size to require the use of babbitted surfaces. Obviously, other anti-friction bearings, such as ball or roller bearings, may be used in lieu of the babbitted types.

Although the invention is applicable to all sizes of dynamoelectric machines, a motor of approxiamtely 5000 h.p. has been chosen for illustrating the teachings of the invention.

Referring more specifically to the drawings, shaft 20 supports the armature 12 of conventional design and includes a spider 24 having a magnetic core 26 mounted on its peripheral surface. The core is equipped with air ducts 27, winding 28, commutator 30 and risers 32 respectively interconnecting each segment of the commutator with its appropriate coil in the winding and in a manner well known in the art. Although a spider is shown, it will be apparent that depending on the size of the particular machine, the armature laminations may be mounted directly on the shaft rather than being supported by a spider or yoke arrangement of the type mentioned above.

The stator or field structure 16 consists of a cylinder 36 supporting a number of field poles 38 bolted or otherwise permanently affixed to the inner surface of the cylinder. Support for cylinder 36 is furnished by rings 64 and 66 and a yoke arrangement 68 more fully described hereafter. Each of the field poles are of conventional design and include a laminated magnetic core 40 having a field winding 42 (FIGURE 2) used for providing the main field flux, and a compensating winding 44 consisting of copper bars located in slots in each field pole face for compensating for armature reaction. Commutating poles 46 likewise are positioned between the main field poles 38 and are mounted on the cylinder 36 by bolts or other securing means. The rectangular blocks 45 shown in FIGURE 1 illustrate the disposition of connectors which serially connect the compensating winding and the commutating pole windings in the field structure with the winding in the armature 12. Such connection arrangements conform to well known practices and do not constitute a part of this invention.

Electric power is supplied to the bar conductors of the armature winding through carbon brushes 48 removably mounted in brush riggings 50, one shown, commutator 30 and risers 32 as in other types of D.-C. motors. Instead of suspending the brush riggings positioned between each pole from the motor frame, they are attached by bolts to the stationary cylinder 36 as generally indicated in the drawing, and the number of brushes in each rigging are chosen in accordance with the power requirements for a particular machine. Because the motor chosen for illustrating the teachings of the invention is of a relatively large size, a number of brushes 48 are shown as being disposed axially of the commutator. In order to provide for brush rigging adjustment in a tangential direction, brush holder brackets 52 equipped with terminal plates 54 are equally spaced circumferentially and mounted on a closed yoke ring 56, which in turn is suspended from individual yoke ring arms 58 rigidly secured to the cylinder 36. It will be apparent that adjustment of the rigging is accomplished merely by moving the yoke ring 56 circumferentially on yoke ring arms 58 to the desired position, whereupon the ring then is firmly locked to the arms.

For simplicity, the electric power leads extending to the armature and field pole windings have been shown as single lines 60 and 62 rather than the multiplicity of conductors which are required for this purpose. Such leads enter the motor through bored openings provided in the stationary framing members 64 and 76 shown. The leads for the field pole windings are located in similar passageways spaced a short distance from those housing the leads extending to the armature windings. It will be understood that lead arrangements different from that illustrated may be resorted to, as by attaching them to the surface of the parts which support the magnetic cores.

The cylinder 36 including the field and commutator poles 38 and 46 disposed around its periphery is fixed in a stationary position by disc-like plates 64 and 66 welded or otherwise attached to the ends of the cylinder. The inner end of the plate 66 is welded to a yoke 68 consisting of a central frame supporting a bearing 70 on its inner end, and outer legs 72 out of contact with shaft 20 but used for forming a labyrinth seal therewith. The bearing 70 is equipped with a babbitted surface adapted for engagement with a journal 74 formed on shaft 20; the design and construction of the parts being such that the yoke is caused to float on the shaft and thus provide the necessary support to the left hand end, as viewed in FIGURE 1, of the stationary field structure. The stator may be supported in any one of a number of alternative ways, depending on the size and disposition of parts comprising the machine. In those instances where the motor is relatively small, sufficient rigidity may be imparted to the stator shell by the plates 64 and 66 and cylinder 36. The yoke 68 and associated parts except the bearing frame 71, may be eliminated thus permitting use of a cantilever construction for support purposes. The electrical forces acting on this construction are balanced at equal torque in each rotor and as a result, gravity is the only force of substantial magnitude needed to be considered in designing the parts to support the stator element.

The inner end of the other plate 64 used for supporting cylinder 36, is welded to an axially extending cylinder 76 adapted for mounting in the bearing housing 18, thereby completing the support arrangement for the field structure.

Since one of the objectives of our invention is to provide a motor having a pair of contra-rotating rotors, it will be seen that this objective is carried out herein by having the outer armature 14 rotate about the field structure 16 in a direction opposite to that of the inner armature 12. The motor armature 14 contains similar electrical components as armature 12 and generally consists of a cylindrical shell 78 supported from the shaft 22 and coaxial element 23 by disc-like plates 80 and 82 which are welded or otherwise affixed at their outer ends to the shell 78. Openings 84 in the plates furnish a means for access to the brushes and brush riggings and generally serve maintenance and motor inspection purposes and for ventilating the machine.

As shown, a laminated magnetic core 77 is mounted immovably on the inner surface of the rotatable shell 78 and is held against axial displacement by rings 86 preferably welded to the shell. The core 77 is of substantially the same design as the inner armature core 26 except that the coils comprising winding 79 are mounted in slots formed on the core inner surface and the latter is shaped to provide an air gap with the stationary field poles or cylinder 36. The bar conductors of the coils are connected to segments of a commutator 88 by risers 90 in a manner similar to that illustrated in FIGURE 2 for the inner structure. The brush riggings 92, including the brushes and means for adjusting their position with respect to the commutator, also are the same as that previously described except that they extend outwardly rather than inwardly. The commutator however is positioned inside-out so that the commutator surface faces inwardly toward the shaft for contact by the brushes rather than outwardly as in conventional commutator design.

As an alternative, the commutator could be designed to have the bars face outwardly of course but the brush rigging would extend outwardly and then inwardly to permit the brushes to contact the commutator surface. Connectors 93 connect the commutator pole windings 95 and the compensating winding 97 in series with the armature winding 98.

To provide a field pole structure with which the outer armature is designed to cooperate, a number of field poles 96 equipped with windings 97, and otherwise the same as the field pole structure 38, are attached to the cylinder 36 in the same manner as that previously described. The arrangement of the other parts likewise is the same except that they are positioned for operation with the outer armature 14, rather than the inner armature 12. Electric power is supplied to the brush assemblies 52 and 92 and to the field pole windings 44, 46 and 95, 97 through leads 60 and 94, which for purposes of simplicity, are shown as single lines. The leads preferably are located in grooves formed in plates 64 and cylinders 36 and 76.

In order to provide for a fine adjustment of voltage or speed, an auxiliary winding 99 may be placed over the main field pole windings 42 on both the inner and outer poles 38 or 96. Adjustment of coil voltage causes a differential in flux between the outer and inner poles, thus resulting in a difference in voltage or speed of the inner or outer armatures. The auxiliary winding 99 obviously may be mounted either on the inside or outside of the main field pole winding.

The various elements constituting the electrical portions of the machine described above, will permit operation of the inner and outer armatures in opposite directions when both sets of field pole windings mounted on cylinder 32 and the armature windings are properly energized. Further description of such operation follows hereafter. In order to transmit such power as may be developed by these rotating elements to the coaxially arranged output shafts 20 and 22, special designs of combined pedestal and thrust bearings are located on each end of the machine.

Figure 3:
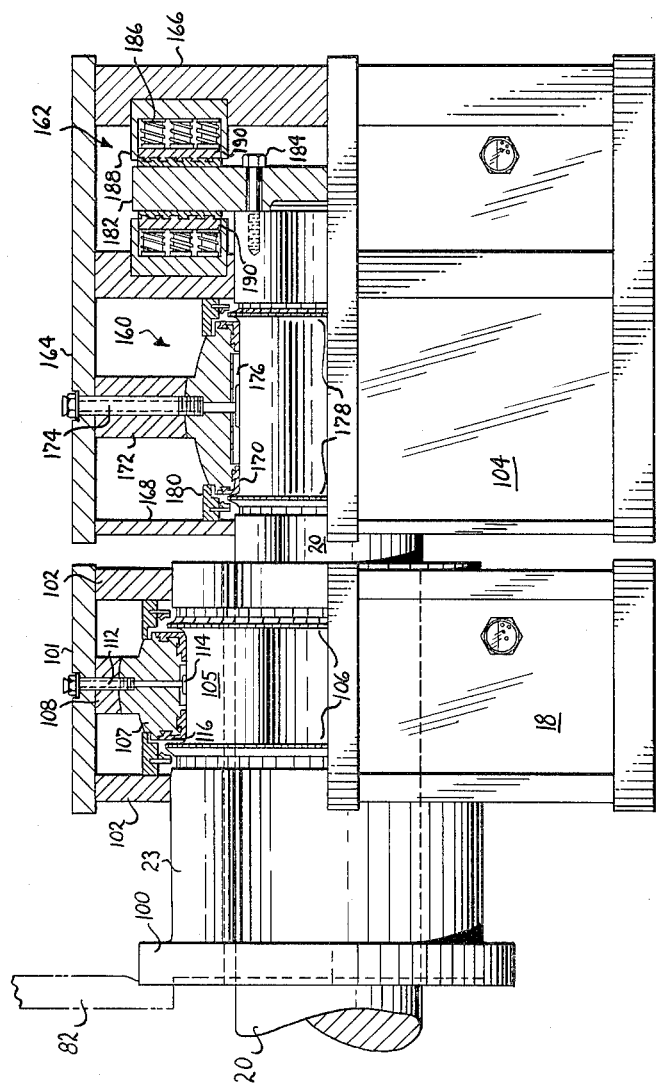
FIGURE 3 is a view in elevation, partly in section, of the bearing disposed on the right side of the motor as illustrated in FIGURE 1.
Figure 4:
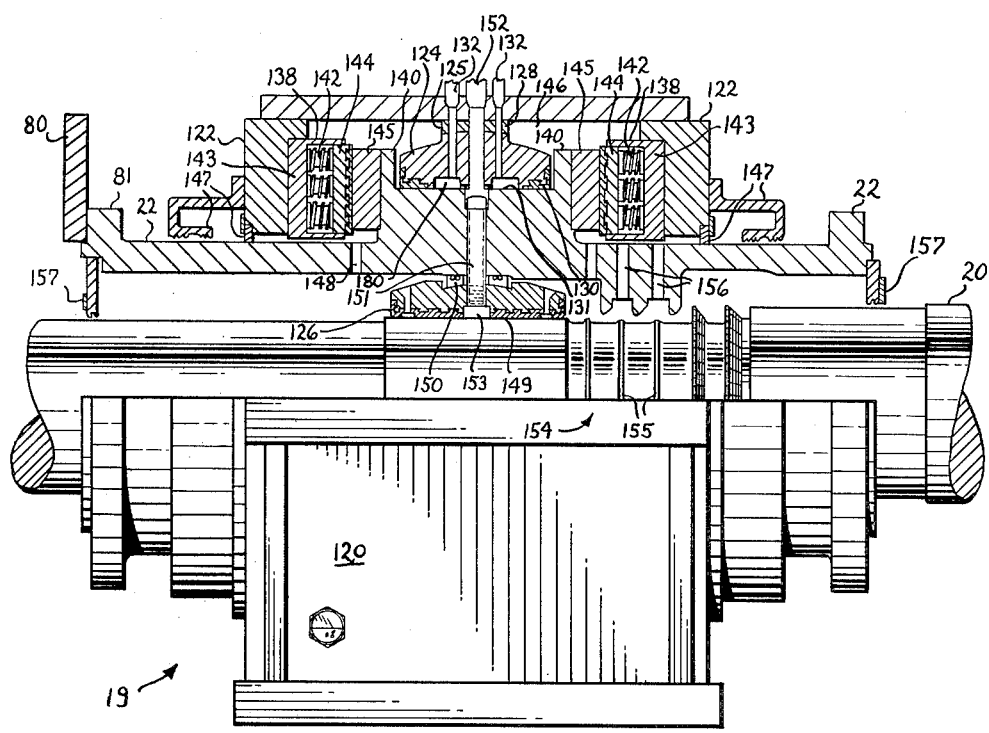
FIGURE 4 is a view in elevation, partly in section, of the bearing element on the left side of the motor as shown in FIGURE 1.

The bearing shown in FIGURE 3 is an enlarged sectional view of the bearing 19 shown on the right of FIGURE 1, while the sectional view of the bearing shown in FIGURE 4 illustrates the design of the bearing shown on the left side of FIGURE 1 in the drawings.

Referring to FIGURE 3, it will be seen that the disc-like plate 82 extending inwardly from the cylindrical shell 78 is welded or otherwise affixed at its inner end to a flange 100 integrally formed with the outer coaxial element 23. The latter is supported in a bearing housing 18, while the inner coaxial shaft 20 is supported in a separate bearing housing 104. The two housing 18 and 104 can, of course, be combined into one housing assembly if desired.

Referring more specifically to the supporting arrangement for the outer coaxial element 23 which is shown generally in FIGURE 1 and specifically in FIGURE 3, it will be seen that it is housed in the bearing pedstal 18 divided to include an upper half 101 equipped with heavy structural rings 102. The coaxial element 23 extends the length of the pedestal and is equipped with a journal 105 of reduced diameter with oil slingers 106 disposed on opposite sides thereof. The journal 105 is supported in a babbitted bearing 107 having a surface area sufficient to carry loads expected during operation. Aligning member 108 which interconnects the bearing and pedestal permits locating the bearing with respect to the journal. Lubricating oil is introduced into the bearing through a hollow pin 112 which serves the dual purpose of a dowel to prevent rotation of the bearing 107 and as a passageway for introduction of oil adapted to be supplied to the bearing under pressure. The oil then is distributed axially along the journal surface from outlet 114 provided in the face of the bearing. To accommodate small thrust loads which inadvertently may be imposed on the structure by shaft 22, as by jolts encountered during shipping, the outer ends of the bearing 107 are equipped with babbitted surfaces 116. However, to fully absorb the loads provided by weight of the equipment and for keeping the rotating elements in alignment, the bearing housing 18 is constructed of heavy parts and of sufficient size to transmit such loads to a foundation.

The outer armature 14 is supported at its other end in the bearing 19 shown at the left of FIGURE 1 and more specifically in FIGURE 4. The left side of the machine shown in FIGURE 1 is the drive end of the motor. Referring to FIGURE 4, the inner end of disc-like plate 80 is welded to a flange 81 on shaft 22 as on the other end of the motor. The bearing pedestal 19 for shaft 22 comprises a housing 120 which encompasses both the rotatable inner and outer shafts 20 and 22 and includes the necessary structural and bearing elements necessary for supporting the weight of the rotating parts and for absorbing thrust forces imposed on the bearing by outer shaft 22. Heavy block-type rings 122 are positioned inwardly of and on opposite sides of the bearing housing 120 and comprise a part of the pedestal. The outer shaft 22 is adapted to rotate within the housing around shaft 20 and in order to provide the required degree of support, a pair of bearing elements 124 and 126 are respectively positioned in the bearing housing 120 for contact by the journal of the shafts. Bearing 124 rests in an aligning ring 125 which is welded as at 128, to the inner surface of the stationary bearing housing 120 and is equipped with babbitted surfaces 130 designed to engage the journal surface 131 provided on the surface of the outer shaft 22. Lubricant is introduced through inlets 132 from which it is distributed axially along the shaft journal surface for providing smooth operation between the parts.

To accommodate thrust forces established by the outer rotor during operation, a pair of thrust bearings 138 are disposed on opposite sides of shoulders 140 formed on shaft 22. The thrust bearings consist of a housing enclosing a multitude of springs 142 held in place by a retaining plate 143 enclosing thrust shoes 144 equipped with a babbitted surface. Split thrust collars 145 are removably fixed on one side to the shaft shoulders 140. Oil under pressure introduced through inlets 132 lubricates the shaft journal surface 131 and fills the bearing cavities 146 thus forming a reservoir which feeds the babbitted surfaces of the thrust elements when the shaft is placed in operation. Conventional labyrinth seals 147 confine the oil within the bearing cavities. Oil is drained from the cavities from the top of the pedestal through a bubbler sight gauge not shown.

It will be evident that during operation, thrust forces will be transmitted from shaft 22 through the shoulders 140 to the appropriate thrust bearing depending on the direction of the applied force. The structure not only provides means for interconnecting the armature 14 with the outer shaft 22, but also accommodates the guide and thrust bearings necessary for proper performance of the motor.

As clearly shown in FIGURE 4, the guide bearing 126 for inner shaft 20 is supported by the shaft 22. The bearing element itself is of conventional design being equipped with a babbitted surface 149 and an aligning ring 150. To hold it immovably in position on shaft 22, a plurality of hollow bolts 151 are fitted in bored holes in the shaft and terminate in screw threads provided in the body of the bearing. Lubricating oil to the bearing is supplied through inlet 152 to a circumferential groove formed in the outer surface of shaft 22. The hollow bolts communicate with the groove and oil is forced therethrough to another circumferential groove from which it is distributed axially between the shaft journal and bearing surfaces.

In order to prevent seepage or discharge of oil from the bearing housing to points remote thereof, the shaft 20 is equipped with a series of deflectors 155 which serve to throw such oil as may leak past the bearing outwardly into openings 156 which then permit the oil to flow around the thrust bearing prior to dropping by gravity into a sump located in the bottom of the bearing pedestal. As in conventional machines, the oil then is cooled as necessary, and recirculated through the bearing by a pump or other pressure producing means. Seals 157 also assist in confining the lubricant to the bearing housing.

Referring back to FIGURE 3, it will be seen that the guide and thrust bearings 160 and 162 used for supporting and absorbing the thrust forces of inner shaft 20 are contained in a bearing pedestal 104. The upper half of the pedestal is stationary and consists of a heavy cap 164 supported by end plates 166 and 168.

The guide bearing 160 is similar to that previously described and includes a babbitted surface 170 which supports shaft 20. An aligning ring 172 spaces the bearing from the pedestal wall or cap 164 and is equipped with hollow bolts 174 which terminate in threaded engagement with the bearing. Oil introduced through the bolts enters the cavity 176, which extends approximately 180° around the bearing, and flows axially outward into the bearing contact area. The inner shaft 20 likewise is equipped with deflectors or flanges 178 similar to flanges 106 formed on the coaxial element 23, which coact with sealing elements 180 to form an oil seal.

Thrust forces generated by the inner armature 12 during operation are transmitted through the inner shaft 20 to the thrust bearing 190 positioned on either side of the thrust collar 182. As shown, a thrust collar 182 is attached to the outer end of shaft 20 by bolts 184 or similar securing means. The thrust absorbing springs 186 are contained by retaining rings 188 as previously described. The thrust bearings 190 likewise are equipped with babbitted surfaces adapted for operation with the steel surfaces of the thrust collar. Lubricant is pumped into the thrust bearing cavity through an opening not shown for providing lubrication to the bearing.

OPERATION

The operation of each armature 12 and 14 of the contra-rotating motor described above is similar to that of a conventional D.C. machine. Excitation power is applied to each main field winding 42 and 98 through leads 62 in a conventional manner. When energized, the adjacent field poles mounted on opposite sides of cylinder 36 and face back to back, are of opposite polarity, one being a north pole, the other, south, thus producing poles of unlike polarity on each pole end. For example, a pole of north polarity on the inner armature would have a pole of south polarity on the outer armature. The complete flux path of the direct axis magnetization includes the two main field poles with return flux paths through the rotor laminations of the inner and outer armatures.

When line voltage is applied to the terminals of the motor, current will flow through the armature circuit comprising the commutator, armature and commutating pole-windings and the compensating winding. The polarity of the interpoles are arranged so that they are of like polarity to the main field poles for a given direction of rotation. For instance, if the inner armature rotates clockwise, the sequence of pole polarity is as follows: main pole—north, commutating pole—north, main pole—south, commutating pole—south. With the pole structure arranged as disclosed herein, commutating poles are of like polarity at the surfaces of the two armatures, that is, the polarity at the tip of the pole adjacent the inner armature is south, while simultaneously, the polarity of the pole for the outer armature is south. This results in the same commutating pole polarity when mounted on the support ring 36.

The flux path for the quadrature axis flux of the commutating pole is through the pole and circumferentially along the support ring 36, and then through a similar commutating pole prior to entering the armature winding.

Unlike the direct axis flux which flows through both armatures, the quadrature flux acts independently. Its strength is regulated by use of non-magnetic shims mounted between the pole and the support ring 36.

As disclosed above, it is possible to obtain different speed and torque characteristics for each of the inner and outer armatures 12 and 14 by independently exciting the auxiliary shunt field winding 99 mounted on each main pole 38 and 96. When either of the auxiliary windings 99 is energized to have a polarity such that it adds to the main field winding, the flux produced will oppose that of the other auxiliary winding located radially outward on the opposite main field pole. This action produces an unbalanced flux condition in the inner and outer armatures with consequent variation in the speed and torque characteristics of each armature. It therefore will be evident that speed and torque control of each armature may be regulated by the degree of excitation of the auxiliary windings 99. The range of control extends between the two maximum limits of permitting one armature to provide varying torque and speed while the other armature is at standstill, and vice versa. All variations in speed and torque for both armatures between these two extremes may be accomplished.

The difference in flux produced by each of the auxiliary windings 99 flows through the field pole support cylinder 36 along with the quadrature axis flux mentioned previously. The amount of flux flowing in this magnetic circuit bears directly on the size of cylinder 36 and its cross sectional area must be chosen of a size sufficient to handle the maximum flux values expected to be encountered during machine operation.

A reversal in rotation can be achieved as in a conventional D.C. machine by merely reversing the polarity of the armature terminals or the main field excitation.

In view of the above, it will be apparent that many modifications and variations are possible in light of the above teachings. It therefore is to be understood that within the scope of the appended claim, the invention may be practiced other than as specifically described.

What we claim as new and desire to secure by United States Letters Patent is:

A bearing assembly comprising: a pedestal including a housing, inner and outer coaxial shafts extending through said housing, a journal on each of said shafts, a first guide bearing mounted on said pedestal and having a surface in contact with the journal on the outer of said coaxial shafts, a second guide bearing supported by the outer of said coaxial shafts and located in the space between said shafts, said second guide bearing having a surface in contact with the journal on the inner of said coaxial shafts, means extending through said guide bearings for providing a lubricating medium to said surface of the first guide bearing and said surface of the second guide bearing, a pair of thrust runners on said outer shaft extending radially outward and disposed on opposite sides of said first guide bearing, and thrust absorbing means on said pedestal including retaining plates having surfaces designed for contact with the runners.

References Cited by the Examiner

UNITED STATES PATENTS

| | | | |
|---|---|---|---|
| 1,185,366 | 5/1916 | Burke | 310—90 |
| 1,893,629 | 1/1933 | Masterson et al. | 310—126 |
| 1,928,690 | 10/1933 | Hohnhorst | 308—189 |
| 2,424,013 | 7/1947 | Belcher | 308—189 |
| 2,462,182 | 2/1949 | Guerdan et al. | 310—115 |
| 2,725,494 | 9/1955 | Anderson | 310—126 |
| 2,864,017 | 10/1958 | Waltscheff | 310—126 |

DON A. WAITE, *Primary Examiner.*

MILTON O. HIRSHFIELD, ROBERT C. RIORDON,
*Examiners.*